No. 667,787.  
C. E. & A. B. LOOSE.  
EYEGLASSES.  
(Application filed July 12, 1900.)

Patented Feb. 12, 1901.

(No Model.)

WITNESSES:
R. G. Hessong.
A. L. Phelps

INVENTORS:
Clarence E. Loose
Alvin B. Loose
BY
C. C. Shepherd
ATTORNEY

UNITED STATES PATENT OFFICE.

CLARENCE E. LOOSE AND ALVIN B. LOOSE, OF COLUMBUS, OHIO.

EYEGLASSES.

SPECIFICATION forming part of Letters Patent No. 667,787, dated February 12, 1901.

Application filed July 12, 1900. Serial No. 23,330. (No model.)

*To all whom it may concern:*

Be it known that we, CLARENCE E. LOOSE and ALVIN B. LOOSE, citizens of the United States, residing at Columbus, in the county of Franklin and State of Ohio, have invented a certain new and useful Improvement in Eyeglasses, of which the following is a specification.

Our invention relates to the improvement of eyeglasses, and has particular relation to the means employed in connection therewith for holding the lenses in proper engagement with the nose; and the objects of our invention are to provide eyeglasses with improved means for connecting the same with the nose of the wearer, to so construct and arrange the nose clamping or engaging devices as to insure a desirable and comfortable engagement of the same and at the same time support the lenses in proper positions in relation to the eyes, to admit of the adjustment of the supporting and clamping devices, to insure the fitting of the same on noses of different sizes and inclination, and to produce other improvements, the details of which will be more fully pointed out hereinafter. These objects we accomplish in the manner illustrated in the accompanying drawings, in which—

Figure 1:
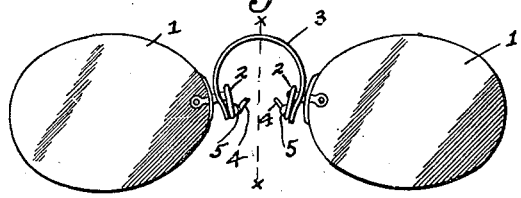
Figure 2:
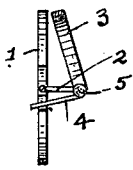
Figure 3:
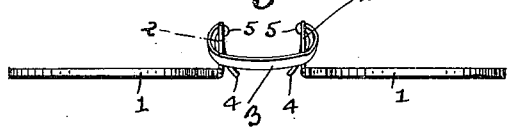

Figure 1 is a rear elevation of a pair of eyeglasses having our improvements thereon. Fig. 2 is a central sectional view on the line *x x* of Fig. 1, and Fig. 3 is a plan view.

Similar numerals refer to similar parts throughout the several views.

1 represents the lenses, with the inner end of each of which is suitably connected a rearwardly-extending and slightly-inclined arm 2. With the outer end portions of these arms 2 are connected the ends of the usual upwardly-bowed nose-spring strip 3. From the outer end of each of the arms 2 extend forwardly and inwardly nose-clamping fingers 4, and at the junction of these fingers and the arms 2 we provide inwardly-projecting pads 5, the latter preferably being of the button form indicated.

It is obvious that in utilizing eyeglasses having the construction above described the projecting pads 5 may engage opposite points on the sides of the nose-bridge and that the forwardly-extending binding-fingers 4 will embrace opposite sides of the nose, these fingers serving to assure the pads 5 in their positions against the nose and to insure the support of the lenses in their proper vertical positions before the eyes.

By securing the ends of the spring 3 to the rear ends of the arms 2 it is evident that said arms may be compressed or separated by bending inward or outward, as desired, to assure the lenses in their proper relative positions with the eyes. It is also evident that the fingers 4 may be likewise adjusted and the proper inclination or curvature imparted thereto to embrace the side of the nose regardless of the curvature or inclination of the latter. From this construction it will be seen that the lenses may be supported at proper angles with the clamping devices and that the usual rigid engagement of the ends of the nose-spring with the lenses is obviated.

Having now fully described our invention, what we claim, and desire to secure by Letters Patent, is—

1. In an eyeglass construction, the combination with the lenses 1 and arms 2 connected with the inner ends thereof and extending rearwardly, of a nose-spring 3 having its ends secured to the outer ends of said arms and clamping-pads 5 opposite the points of connection of said arms and nose-spring, substantially as specified.

2. In an eyeglass construction, the combination with the lenses 1 and arms 2 extending rearwardly from the inner ends thereof, of a nose-spring 3 having its ends secured to the outer ends of said arms 2, pads 5 on the outer ends of said arms and fingers 4 extending from the arms 2 forwardly, substantially as specified.

CLARENCE E. LOOSE.
     ALVIN B. LOOSE.

In presence of—
 C. C. SHEPHERD,
 C. M. MORROW.